March 14, 1967  O. M. JONSSON  3,308,675
CONTROL DEVICE

Filed Dec. 11, 1964  2 Sheets-Sheet 1

INVENTOR.
OLOV MATTIAS JONSSON
BY
ATTORNEYS

March 14, 1967  O. M. JONSSON  3,308,675
CONTROL DEVICE

Filed Dec. 11, 1964  2 Sheets-Sheet 2

INVENTOR.
OLOV MATTIAS JONSSON
BY
ATTORNEYS

United States Patent Office 3,308,675
Patented Mar. 14, 1967

3,308,675
CONTROL DEVICE
Olov Mattias Jonsson, Karlskoga, Sweden, assignor to Aktiebolaget Bofors, Bofors, Sweden, a corporation of Sweden
Filed Dec. 11, 1964, Ser. No. 417,736
Claims priority, application Sweden, Dec. 20, 1963, 14,340/63
7 Claims. (Cl. 74—471)

The present invention is related to a control device for controlling several magnitudes, and more particularly to a device of the type comprising a control lever, which is mounted in a universal joint in such a way that it can be pivoted from a neutral position within a given solid angle about the neutral position.

In several fields of application it is desired to control an object, a process or operation the control of which may involve two variable magnitudes. For instance, the purpose may be to control the position, the velocity or the acceleration of an object in two different coordinate directions, as for instance to control a guided projectile as to azimuth and elevation in reference to the point of fire, to direct a radar antenna, a gun or similar device as to azimuth and elevation. In radar stations it is sometimes desired to control the position of a marker symbol across the screen of the P.P.I. of the radar station. To make it possible for an operator to carry out such a control rapidly and accurately it is desirable to have a manual control device, which has two directions of freedom of movement as closely as possible simulating the degrees of freedom of the supervised object and which is provided with two signal generators generating signals representing the displacement of the control device in its two directions of freedom of movement.

To attain this purpose, it is known to use a control device comprising a spheric ball which is mounted in such a way that it can be rotated arbitrarily about its center and to which two signal generators are mechanically coupled by means of small wheels resting against the surface of the ball in such a way that the wheels are influenced by the rotations of the ball about two mutually orthogonal axes. A control device of this type has certain advantages, particularly when the control range is large, as the spheric ball can be rotated an arbitrary number of turns. The spheric shape of the ball makes it easy to operate in an accurate and sensitive manner by means of the palm of the hand or the finger tips. This control device has however also certain disadvantages. Thus it is not possible to provide it with a well defined zero or neutral position, which can be easily indicated to the operator. In certain cases it is also desired that the control device automatically returns under spring action to a predetermined neutral position when the operator releases the control device. Such an operation cannot easily be realized with a control device of this type.

These problems can to a certain extent be solved by means of a control device comprising a control lever, which is mounted in such a way in a universal joint that it can be freely pivoted within a given spatial angle about a predetermined neutral position and which is provided with two signal generators coupled to the control lever so as to be responsive to the deflections of the control lever about two mutually orthogonal axes which are perpendicular to the neutral position of the control lever. The control lever may be for instance be mounted so that it is pivotal about a shaft perpendicular to the longitudinal direction of the control lever. The shaft is journalled in a gimbal pivotal about a stationary shaft which is perpendicular to said first shaft and also to the neutral position of the control lever, the two signal generators being mechanically coupled to one each of said two shafts. If it be desired that the control lever shall automatically return under spring action to the neutral position, this can be readily achieved by means of two separate springs, one being arranged to act upon the shaft journalled in the gimbal and the other to act upon the stationary shaft of the gimbal. The two springs may also be arranged to act directly on the control lever in such a way that the one spring counteracts the deflection of the control lever about the shaft journalled in the gimbal and the second spring counteracts the deflection of the control lever about the shaft of the gimbal. Generally it is desired that a certain force is required for deflecting the control lever from its neutral position. This can be achieved by providing the two springs with a certain bias tension when the control lever is in its neutral position. Such a spring device has however that disadvantage that the force required for moving the control lever from its neutral position is dependent on the direction in which the control lever is moved. As a result, the force will be smallest when the control lever is deflected from its neutral position in a direction parallel with one of the shafts and largest when the control lever is deflected in a direction half way between the directions parallel with the two shafts. There exist consequently certain preferential directions for the movement of the control lever from its neutral position. If the control lever is pivoted about only one shaft, that is, in a direction parallel with the other shaft, there will occur a pronounced and rapid change of the spring force acting upon the control lever when the control lever passes the plane including the neutral position of the control lever and the shaft about which the control lever is pivoted. These phenomena make an accurate and sensitive operation of the control lever difficult.

This disadvantage is completely eliminated in a control device according to the invention, which comprises a single spring device acting upon the control lever and counteracting its deflection from the neutral position by a spring force permanently directed towards the neutral position of the control lever and increasing with the deflection of the control lever from its neutral position. Such force is dependent only upon the magnitude of this deflection but is independent of the direction of the deflection of the control lever from its neutral position. In a control device according to the invention the force required for deflecting the control lever from its neutral position will consequently be constant and independent of the direction in which the control lever is deflected from the neutral position. Furthermore, the spring force acting upon the control lever will always be directed to-control lever from its neutral position, the spring force wards the neutral position. For a given deflection of the control lever from its neutral position, the spring force will also have a given magnitude which is entirely independent of the direction of the deflection of the control lever with respect to its neutral position. Thus for instance, if the control lever would be moved in a circle concentrically about its neutral position, the spring force acting upon the control lever will remain constnt in magnitude and will be permanently directed towards the neutral position.

According to one embodiment of the invention the spring device comprises preferably a first member having a circular edge, a second member provided with a plane seating surface for the circular edge of first member and a spring arranged to keep said two members together in a stable position with the circular edge of the first member resting along its entire length against the seating surface of the second member under the influence of a spring force perpendicular to the plane of the seating surface and the circular edge but permitting a mutual rocking movement between said two members about any arbitrary point along the circular edge of the first member. One of said two members is mechanically connected or coupled to the control lever so as to duplicate the movement of the control lever about its neutral position by a rocking movement relative to the other member about the stable position, said other member being attached to or mounted in a stationary member.

In the following the invention will be further described with reference to the accompanying drawing, in which by way of example:

Figure 1:
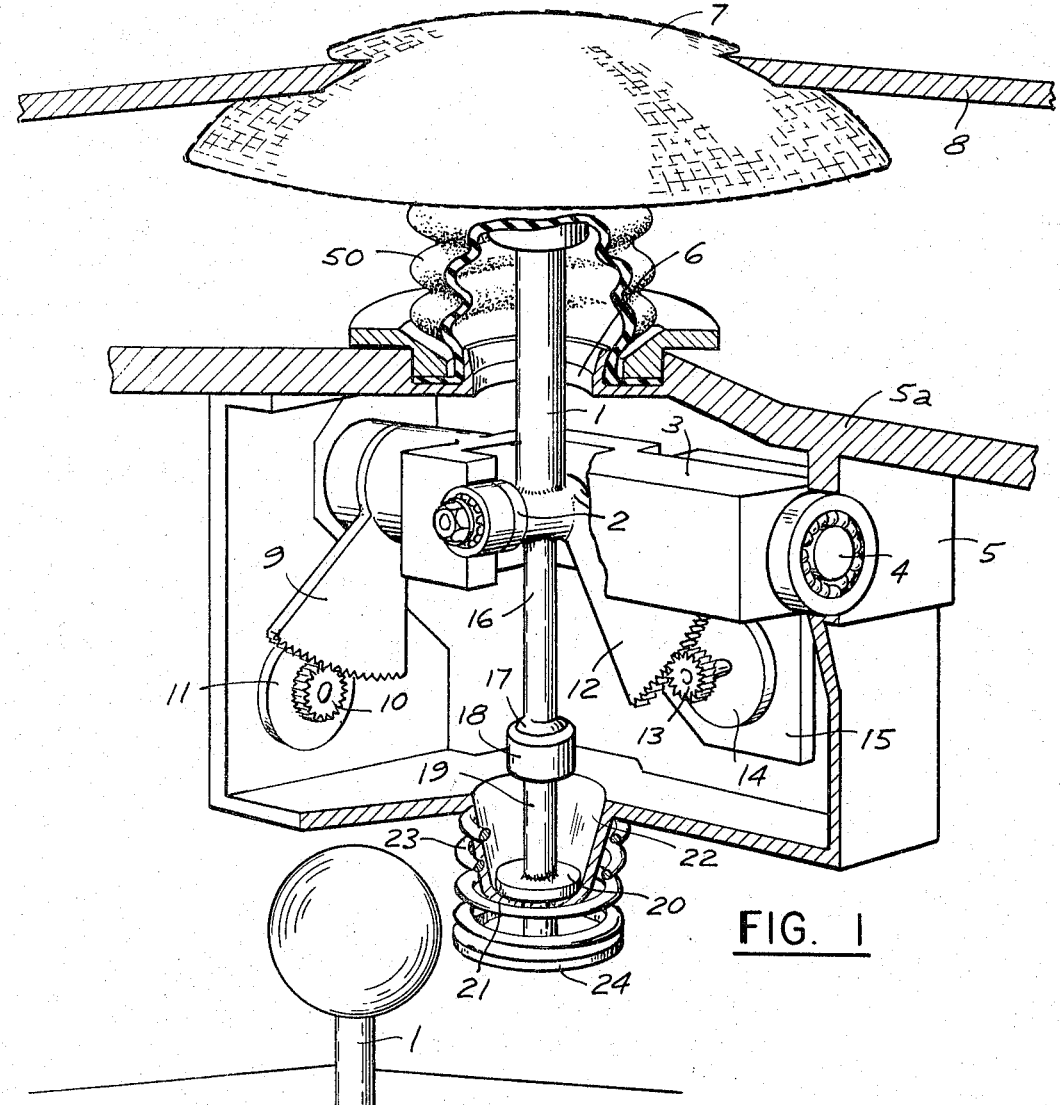
FIG. 1 shows in perspective and partially in section one form of a control device according to the invention, the control lever being in its neutral position.
Figure 2:
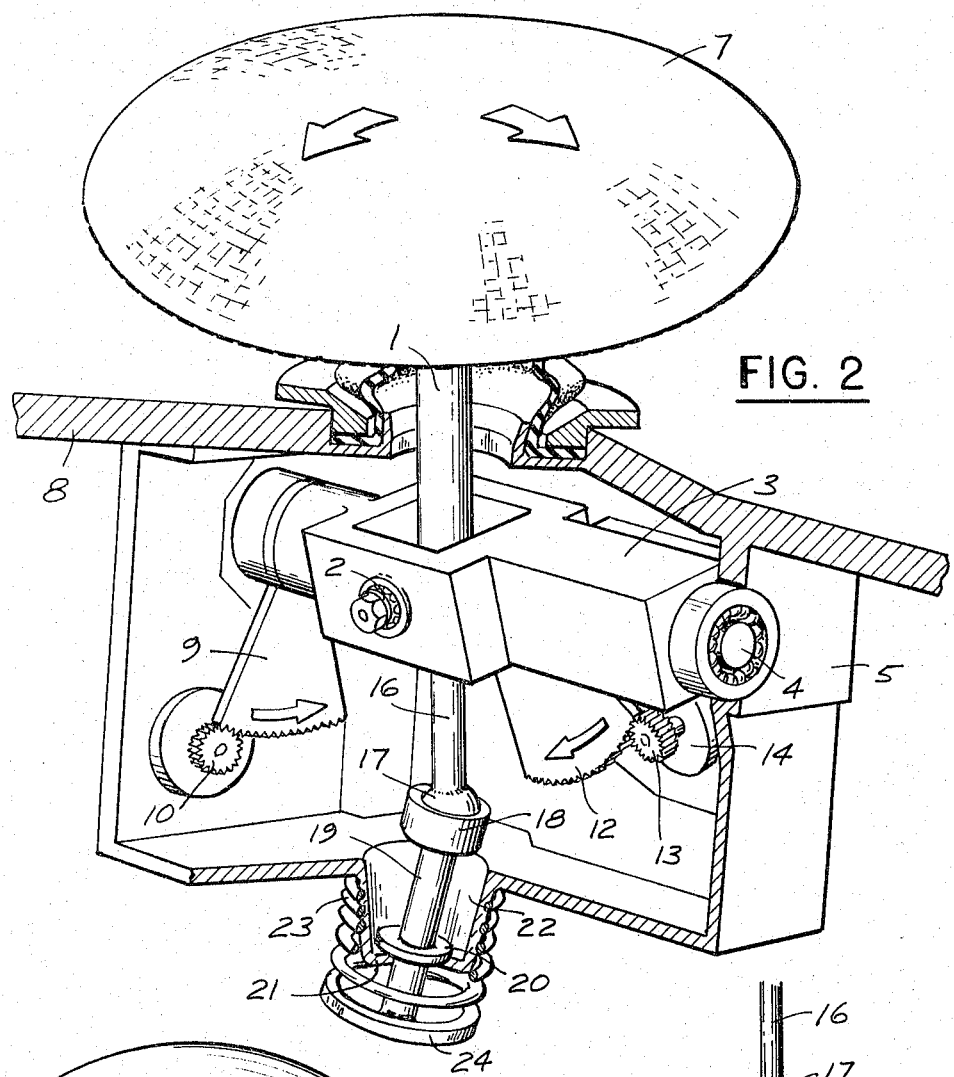
FIG. 2 shows the same control device as FIG. 1, but the control lever being in a position deflected from the neutral position.
Figure 3:
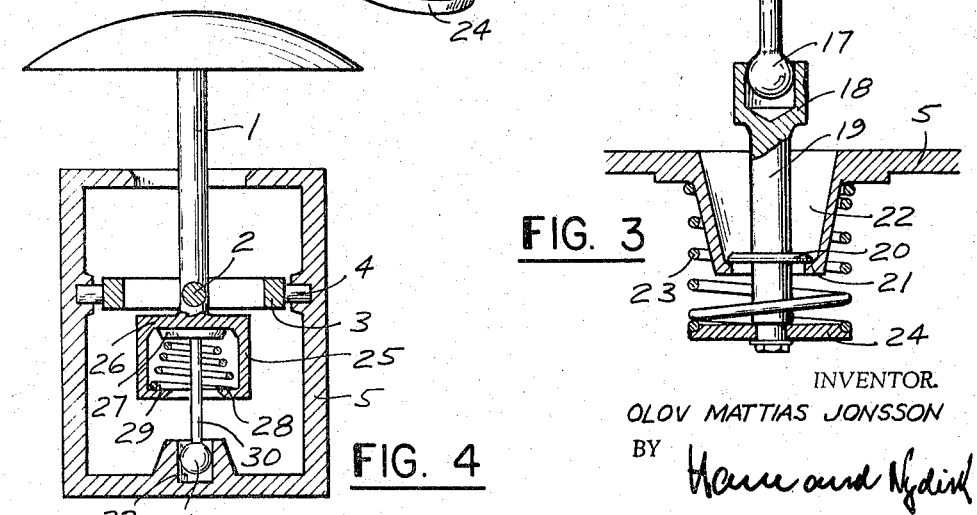
FIG. 3 shows a sectional view of the spring device of the control device according to FIGS. 1 and 2.

The control device according to the invention as shown in FIGS. 1, 2 and 3 comprises a control lever 1 which is pivotal about a shaft 2 perpendicular to the longitudinal direction of the control lever. The shaft 2 is journalled in a gimbal 3 which can be pivoted about a shaft 4. The shaft is journalled in a casing 5 for the control device and is perpendicular to shaft 2 and also to the vertical, neutral position of the control lever. The control lever 1 protrudes through an opening 6 in the lid 5a of the casing 5 and its upper end is provided with a grip 7 shaped as a spheric calotte which partly protrudes through a circular opening in a stationary plate or panel 8. A bellows 50 may be interposed between lid 5a and grip 7, sealed at its ends to the lid and the grip respectively.

As is apparent, the control lever 1 can be freely pivoted within a given spatial angle about its vertical neutral position and has consequently two directions of freedom, one being a rotation about the shaft 2 and the second a rotation about the shaft 4, as indicated by two arrows in FIG. 2, in which the control device is shown with the control lever deflected from the neutral position of FIG. 1. The grip 7 in the shape of a calotte will give the operator the feeling that the control lever is a spheric, arbitrarily rotatable ball, which the operator can operate accurately and sensitively by means of his palm or his fingertips, while resting his wrist and forearm upon the plate 8.

A toothed segment 9 is attached to the shaft 4. The toothed segment 9 is engaging a gear 10 seated on the shaft of a signal generator 11, for instance a potentiometer, stationarily mounted in the casing 5. The signal generator will consequently generate a signal corresponding to the angle of rotation of the control lever about the shaft 4, that is, the one direction of freedom of the lever. Shaft 2 is similarly provided with a toothed sector 12 in engagement with a gear 13 on the shaft of a second signal generator 14 mounted on a plate 15 attached to the gimbal 3 and consequently generating a signal representing the angle of rotation of the control lever about the shaft 2, that is in the second direction of freedom of the control lever.

The control lever 1 has below the cardan joint or gimbal suspension an extension 16 terminating in a ball 17 seated in a socket 18 formed at the upper end of a rod 19. The rod mounts a circular, annular disk 20 which is perpendicular to the longitudinal direction of the rod and abuts against the annular base 21 of a recess 22 in the bottom of the casing 5. Base 21 is perpendicular to the neutral position of the control lever and the disk 20 is kept in contact with the base by a coil spring 23 disposed between the bottom side of base 21 and a disk 24 attached to the lower end of the rod 19 and serving as a spring stop. As can best be seen in FIG. 3, the ball 17 is displaceable within the socket 18 in the longitudinal direction of the rod 19. It is evident that when the control lever 6 is deflected from its neutral position, its movement relative to its neutral position will be duplicated by the rod 19 and the disk 20, which will rock relative to the annular seating base 21 about the peripheral edge of the disk 20 against the action from the spring 23. As the spring device is completely symmetrical and the rod 19 can be tilted in any arbitrary direction from its stable position shown in FIG. 1, the deflection of the control lever 1 from its neutral position will be counteracted by a spring force, which is entirely independent of the direction of deflection of the control lever and has a magnitude determined only by the magnitude of the angle through which the control lever is deflected from its neutral position. The outer rim of the disk 20 is preferably tapered to a sharp edge and the walls of the recess 22 are somewhat conical, whereby a well defined and substantially friction-free movement is achieved for the rod 19 and the disk 20 relative to the seating base 21.

Figure 4:
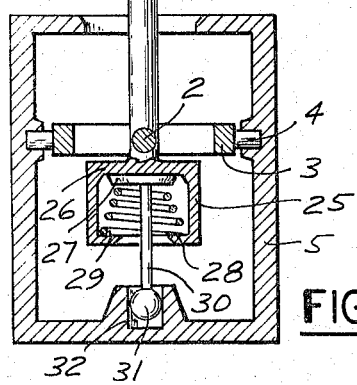
FIG. 4 shows schematically and in section a modification of a control device according to the invention, the control lever being in its neutral position.

When it is desired to maintain the dimensions of the control device in the longitudinal direction of the control lever as small as possible, a control device according to FIG. 4 may be used. This figure shows the control device only schematically and with the signal generators omitted for the sake of simplicity.

The control device of FIG. 4 comprises, just as the control device shown in FIGS. 1, 2 and 3, the control lever 1 provided with the grip 7 in the shape of a spheric calotte and pivotal about the shaft 2 perpendicular to the longitudinal direction of the control lever. The shaft is journalled in gimbal 3, which is pivotal about shaft 4 perpendicular to the shaft 2 and also to the neutral position of the control lever. The shaft 4 is journalled in the casing 5 of the control device. In this form of the invention, a spring force counteracting the deflection of the control lever from its neutral position and being completely symmetrical about the neutral position is obtained by means of a spring device comprising an abutment member 25 attached to the control lever 1 below its cardan joint and having a wall 26 perpendicular to the longitudinal direction of the control lever 1. Wall 26 has a circular inner circumference against which a circular disk 27 is pressed by a coil spring 29 fastened between the disk 27 and an annular flange 28 at the open end of the cylindrical member 25. The disk 27 is attached to the upper end of a rod 30, the lower end of which mounts a ball 31 displaceable in a vertical, cylindrical guide bore 32 in the bottom of the casing 5 of the control device.

When the control lever 1 is deflected from its vertical neutral position shown in the figure, the disk 27 on the rod 30 will obviously be rocked relative to wall 26 in the member 25 about the circular circumference of the disk 27 against the action of the coil spring 29. The peripheral rim of the disk 27 is tapered to a sharp edge. The deflection of the control lever 1 will consequently be counteracted by a spring force, with the same properties as that in the control device shown in FIGS. 1, 2 and 3.

The member 25 need not have solid walls but it is sufficient when arms or posts project from the wall 26 and support the spring stop 28 for the coil spring 29. The lower surface of the part 26 must however be provided with a circular flange encircling the circumference of the disk 27 and keeping the disk 27 in a defined position relative to the wall 26 attached to the control lever 1.

Figure 5:
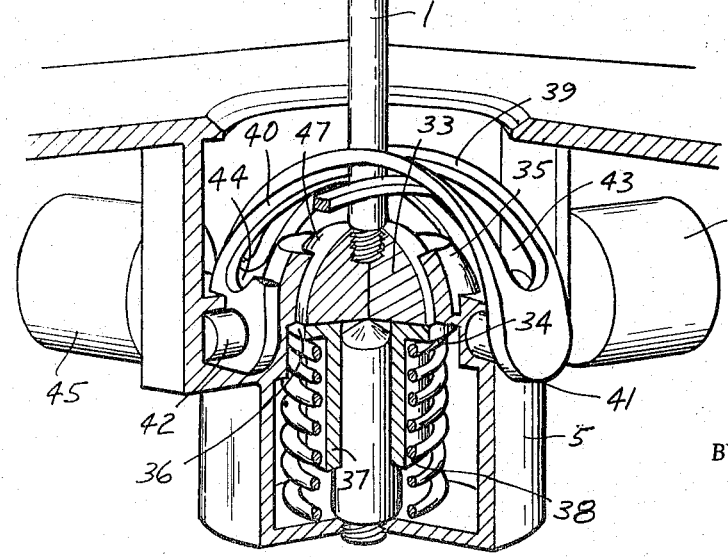
FIG. 5 shows in perspective and partially in section another modification of a control device according to the invention, the control lever being in a position deflected from the neutral position.

The dimensions of the control device may be further reduced with the arrangement shown in FIG. 5. In this form of the invention the control lever 1 is not mounted in a cardan joint or gimbal suspension, but its lower end is provided with a semishperical member 33 concentrically disposed with respect to the longitudinal direction of the control lever. The plane circular surface 34 of the semisphere is facing downwardly. The semispherical member 33 is seated in a matching socket 35 stationarily mounted in the casing 5 of the control device. The socket 35 has a central opening for receiving the control lever. A plane disk 36 is resting against the plane lower surface 34 of the semi-spherical member 33. The disk 36 is perpendicular to the vertical neutral position of the control lever and can be displaced in vertical direction on guide means 37 in the bottom of the casing 5 of the control device. The disk 36 is pressed against the plane lower surface 34 of the member 33 by a coil spring 38 fastened between the bottom of the casing 5 and the disk 36. The force of the coil spring 38 is maintaining member 33 in a position in the socket 35 such that the member 33 and the socket 35 form a universal ball joint for the control lever 1 about which the control lever can be arbitrarily pivoted within a given solid angle about its vertical neutral position.

When the lever is deflected from its neutral position the semispherical member 33 will evidently be tilted relative to the horizontal disk 36 about the circular rim of member 33 against the force of the coil spring 38. The disk 36 is displaced in vertical direction in its guide means 37 to the extent necessary to permit the tilting movement of member 33 relative to the disk 36. In this form of a control device according to the invention the spring force acting upon the control level 1 is also entirely symmetrical about the neutral position of the control lever and independent of the direction of deflection of the control lever from its neutral position.

For conveying the movements of the control lever 1 in its two directions of freedom to two signal generators the control device is provided with two semicircular yokes 39 and 40 disposed outside one another and pivotal about two mutually orthogonal shafts 41 and 42, which are perpendicular to the vertical neutral position of the control lever. The shafts 41 and 42 are stationarily mounted in the casing 5 of the control device and are disposed in the same plane as the pivot center of the control lever. Each one of the yokes 39, 40 is provided with a slot 43 and 44 respectively, extending in the longitudinal direction of the yoke along a portion of the respective yoke. The control lever 1 is extended through these slots which intersect each other. Consequently the two yokes 39 and 40 will be pivoted about their shafts in accordance with the movement of the control lever 1 about these shafts. The one yoke 39 is coupled to a signal generator 45, for instance a potentiometer, and the other yoke 40 is in the same way coupled to a second signal generator 46.

In addition to the advantage of its small dimensions this form of the control device according to the invention has the advantage that both signal generators can be stationarily mounted in the casing of the control device.

In the control device according to the FIG. 5, deflection of the control lever from its neutral position, will cause a certain sliding movement between the circular rim of the semispherical member 33 and the disk 36. The friction caused by such movement is eliminated to a large extent when the circular rim of member 33 is somewhat rounded and a suitable material is used for the member 33 and the disk 36 and a suitable lubrication for these members is provided.

While the invention has been described in detail with respect to certain now preferred examples and embodiments of the invention, it will be understood by those skilled in the art after understanding the invention that various changes and modifications may be made without departing from the spirit and scope of the invention, and it is intended therefore to cover all such changes and modifications in the appended claims.

What is claimed as new and desired to be secured by Letters Patent is:

I claim:

1. A control device comprising a control lever, a pivot joint supporting said lever at one end thereof universally pivotal within a given solid angle relative to a neutral position of the lever, and return spring means acting upon said lever in any position of tilt thereof to urge the lever continuously toward said neutral position, said return spring means including a first member having a surface bounded by a plane circular rim, a second member having a plane seating surface for said first member, one of said members being connected to said lever for participation in pivotal movements thereof and the other member being stationarily mounted, and a spring means axially and symmetrically disposed relative to the circular rim of said first member to act upon one of said members in a direction normal to said plane seating surface when the lever is in its neutral position to urge the two members into a stable position relative to each other in which position said circular rim abuts along substantially its entire periphery against said plane surface while permitting an angular rocking movement of the first member in reference to said seating surface about any peripheral point of the rim.

2. A control device according to claim 1 wherein said plane surface of the second member is continued in a further surface extending at an angle from said plane surface and surrounding the outer diameter of said circular rim.

3. A control device comprising a control lever, a pivot joint supporting said lever at one end thereof universally pivotal within a given solid angle relative to a neutral position of the lever, said control lever being extended beyond said pivot joint, a rod and a universal joint joining said extension of the lever and said rod for angular movement of said extension and said rod in reference to each other, a plane annular disk transversely secured to said rod, a stationarily mounted abutment member having a plane seating surface disposed at a right angle in reference to said lever when in its neutral position, said seating surface extending to a further surface encircling the same and extending at an angle in reference thereto, and a coil spring means coaxially encompassing said rod and urging said disk flat against said plane seating surface from any position of tilt of the lever in reference to the neutral position thereof.

4. A control device according to claim 3 wherein the peripheral rim of said annular disk is tapered away from said seating surface and said further surface is forming an obtuse angle with said seating surface.

5. A control device comprising a control lever, a pivot joint supporting said lever at one end thereof universally pivotal within a given solid angle relative to a neutral position of the lever, the control lever being extended beyond said pivot joint, and an abutment member mounted on said lever extension, said abutment member having opposite said pivot joint a circular plane seating surface centrically aligned with the axis of said lever and continued in a further surface extending at an angle from said seating surface to define a cup therewith, a rod, a circular disk transversely secured to one end of said rod and fitted in said cup in engagement with said plane seating surface, a stationarily mounted universal joint means supporting the other end of the rod freely pivotal and lengthwise displaceable, said joint means being disposed in axial alignment with said lever in the neutral position, and spring means perpendicularly and symmetrically acting upon said disk to urge the same continuously against said seating surface.

6. A control device comprising a control lever, a pivot joint supporting said lever at one end thereof universally pivotal within a given solid angle relative to a neutral position of the lever, the lever being extended beyond said pivot joint, and an abutment member secured to said lever extension for pivotal movement in unison with the lever and having a plane circular surface on its side opposite pivot joint, said surface being centrically aligned with a lengthwise axis of said lever and vertical thereto, a plane seating disk, mounting means supporting said disk parallel to said circular surface when the control lever is in its neutral position and displaceable perpendicularly to its own plane in reference to said circular surface of the abutment member, and spring means symmetrically acting upon said disk in the direction perpendicular to plane thereof.

7. A control device according to claim 6 wherein said abutment member comprises a semi-spherical member, the flat wall portion of said member constituting said plane circular surface, said semi-spherical member being secured to said extension of the control lever coaxially therewith, and wherein a stationarily mounted socket having an inner wall matching said semi-spherical member houses the same freely pivotal in reference to the socket, the plane surface of said semi-spherical member facing outwardly for engagement with said disk and said socket having a bottom opening for passage of the lever.

References Cited by the Examiner
UNITED STATES PATENTS

| | | | |
|---|---|---|---|
| 2,539,217 | 1/1951 | Willoughby | 74—471 X |
| 2,700,904 | 2/1955 | Woods | 74—471 |
| 2,762,234 | 9/1956 | Dodd | 74—471 |

MILTON KAUFMAN, *Primary Examiner.*